Patented Aug. 4, 1936

2,049,657

UNITED STATES PATENT OFFICE 2,049,657

PROCESS AND COMPOSITION FOR COLORING ORGANIC DERIVATIVES OF CELLULOSE

Simon Thomson McQueen and Alexander Stewart, Blackley, Manchester, England, assignors to Imperial Chemical Industries Limited, a corporation of Great Britain No Drawing. Application March 9, 1933, Serial No. 660,190. In Great Britain March 11, 1932

4 Claims. (Cl. 8—5)

This invention relates to the dyeing and printing of organic cellulose derivatives such as cellulose esters and ethers, e. g. cellulose acetate.

It is an object of this invention to improve the process of dyeing or printing organic cellulose derivatives by means of dyestuffs which are sparingly soluble or substantially insoluble in water.

We have discovered that by the addition of an aryl or aralkyl ether of a polyhydroxy alcohol to a dyebath or printing paste containing a water insoluble dyestuff for application to cellulose esters or ethers the colour value of the dyestuff is considerably enhanced. This means that according to our present process with a given amount of colour there can be produced, e. g. on acetate silk, a greater depth of shade than when the addition of glycerol ether as prescribed by us is omitted.

As examples of ethers of polyhydroxy alcohols which we may employ we mention the mono and di-o-tolylethers of glycerine or glycol, the di-m-tolyl ether, the mono- and di-phenyl ethers and the dibenzyl ether but we do not confine ourselves to the use of these ethers.

When speaking of the monoethers of glycerine we mean either the alpha- or beta-ethers or a mixture of both; and with respect to the diethers, these include the alphabeta or alpha-gamma or mixtures of both.

These ethers, although immiscible with water, may be added to the printing paste in their original form or in the form of an aqueous emulsion. In dyeing, while not absolutely necessary, it is preferable to use an aqueous emulsion of the chosen ether.

The ether or ether emulsion may also be incorporated with the dyestuff paste previous to the addition of the latter to the printing paste or dyebath and in this way a composition of matter is obtained which is very suitable for use in carrying out our invention. Provided sufficient ether is employed in the dyestuff paste, the use of such a composition renders it unnecessary to make separate additions of ether to the printing paste or dyebath.

In printing according to the process of the present invention not only is the depth of shade increased as compared with what is obtainable without the addition of a polyhydroxy ether, but the time of steaming required to fix the colour and develop the shade is also reduced as compared with the time required in the absence of such an ether.

The preparation of a polyhydroxy ether emulsion may be carried out as illustrated in the following example, in which the parts are by weight.

*Example I*

A solution is prepared by mixing together 4.5 parts of an aqueous 60% gum senegal solution, 3.0 parts of stearic acid, 7.5 parts of concentrated ammonia (Sp. gr.=0.880), and 48.3 parts of water.

Into this solution there are added in a slow stream and with vigorous stirring 45 parts of glycerol di-o-tolyl ether, the stirring being continued after the addition until a uniform emulsion is obtained.

The following examples illustrate typical printing pastes according to this invention but without limiting the same. The parts are by weight.

*Example II*

A printing paste is prepared in known manner from the following ingredients:

| | Parts |
|---|---|
| 1,4-di-methylamino-anthraquinone in paste form | 12 |
| Dark British gum thickening (50%) | 62.8 |
| Soluble oil | 3.0 |
| Glycerine | 1.0 |
| Glycerol-di-o-tolyl ether emulsion (41%) | 21.2 |
| | 100.0 |

Acetate silk material is printed with the above paste, dried, steamed for 5 minutes at 101–102° C., rinsed and dried. The printed material exhibits marked improvement as to shade, as compared to material printed with a similar paste but containing no glycerol-di-tolyl ether.

*Example III*

The printing paste is prepared as follows:

| | Parts |
|---|---|
| 1,4-diamino-2-methoxy-anthraquinone paste | 20 |
| Dark British gum thickening (50%) | 68 |
| Soluble oil | 3 |
| Glycerine | 1 |
| Glycerol-di-o-tolyl ether | 8 |
| | 100 |

Acetate silk material is printed with this paste, as in Example II, and shows marked improvements.

Example IV

The composition of the printing paste is as follows:

| | Parts |
|---|---|
| 1-methylamino-4-(4'-amino)-anilido-anthraquinone paste | 20 |
| Dark British gum thickening (50%) | 68 |
| Soluble oil | 2 |
| Glycerine | 1 |
| Glycerol-dibenzyl ether | 9 |
| | 100 |

The printing and steaming is performed as in Example II.

The following example illustrates the method wherein the ether is incorporated in the dyestuff paste, prior to the preparation of the printing paste.

Example V 210 parts of 1,4-di-methylamino-anthraquinone in paste form are mixed with 210 parts of glycerol di-orthotolylether emulsion (41%) and the mixture is evaporated on the water bath until the total weight is 230 parts. The composition so obtained can be used in printing pastes without the necessity of adding the ether separately.

It will be understood that many variations and modifications are possible in our preferred mode of operation, without departing from the spirit of this invention.

We claim:

1. In the process of printing cellulose ester material with water-insoluble dyestuffs adapted to color the same, the improvement which comprises applying the dyestuff in the presence of an ether of a polyhydroxy alcohol selected from the group consisting of aryl ethers and aralkyl ethers.

2. In the process of printing cellulose ester material with water-insoluble dyestuffs adapted to color the same, the improvement which comprises applying the dyestuff in the presence of a diaryl ether of glycerine.

3. A printing paste comprising a water-insoluble dyestuff adapted to color cellulose acetate material and an assistant selected from the group consisting of aryl and aralkyl ethers of polyhydroxy alcohol.

4. A printing paste for cellulose acetate material comprising a water-insoluble dyestuff adapted to color cellulose acetate material and a diaryl ether of glycerine.

SIMON THOMSON McQUEEN.
ALEXANDER STEWART.